Oct. 1, 1935.   L. J. CAMPBELL   2,015,841
CLUTCH MECHANISM AND CONTROL FOR CHANGE SPEED TRANSMISSIONS
Filed Nov. 12, 1934   4 Sheets-Sheet 1
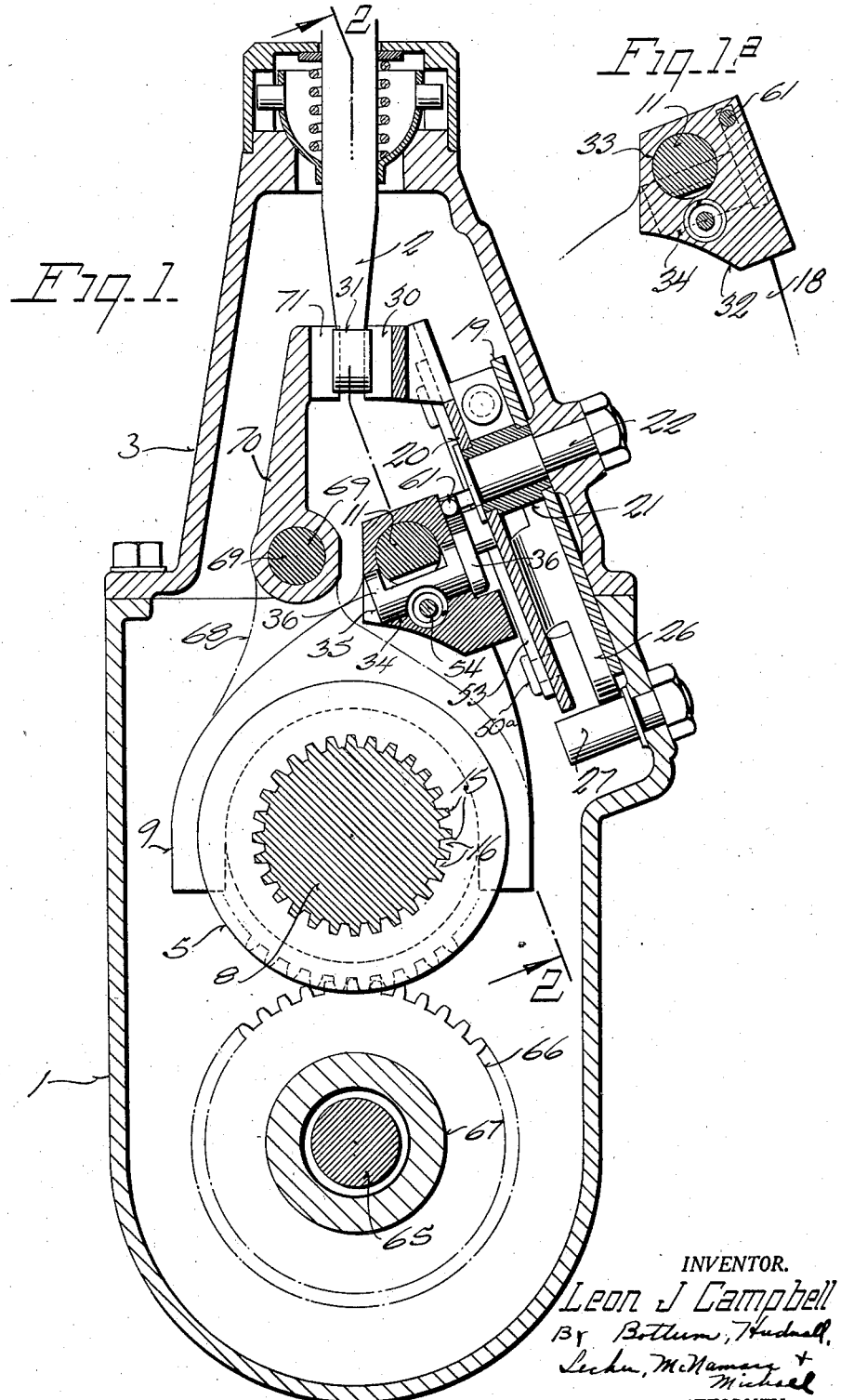
INVENTOR.
Leon J Campbell
ATTORNEYS

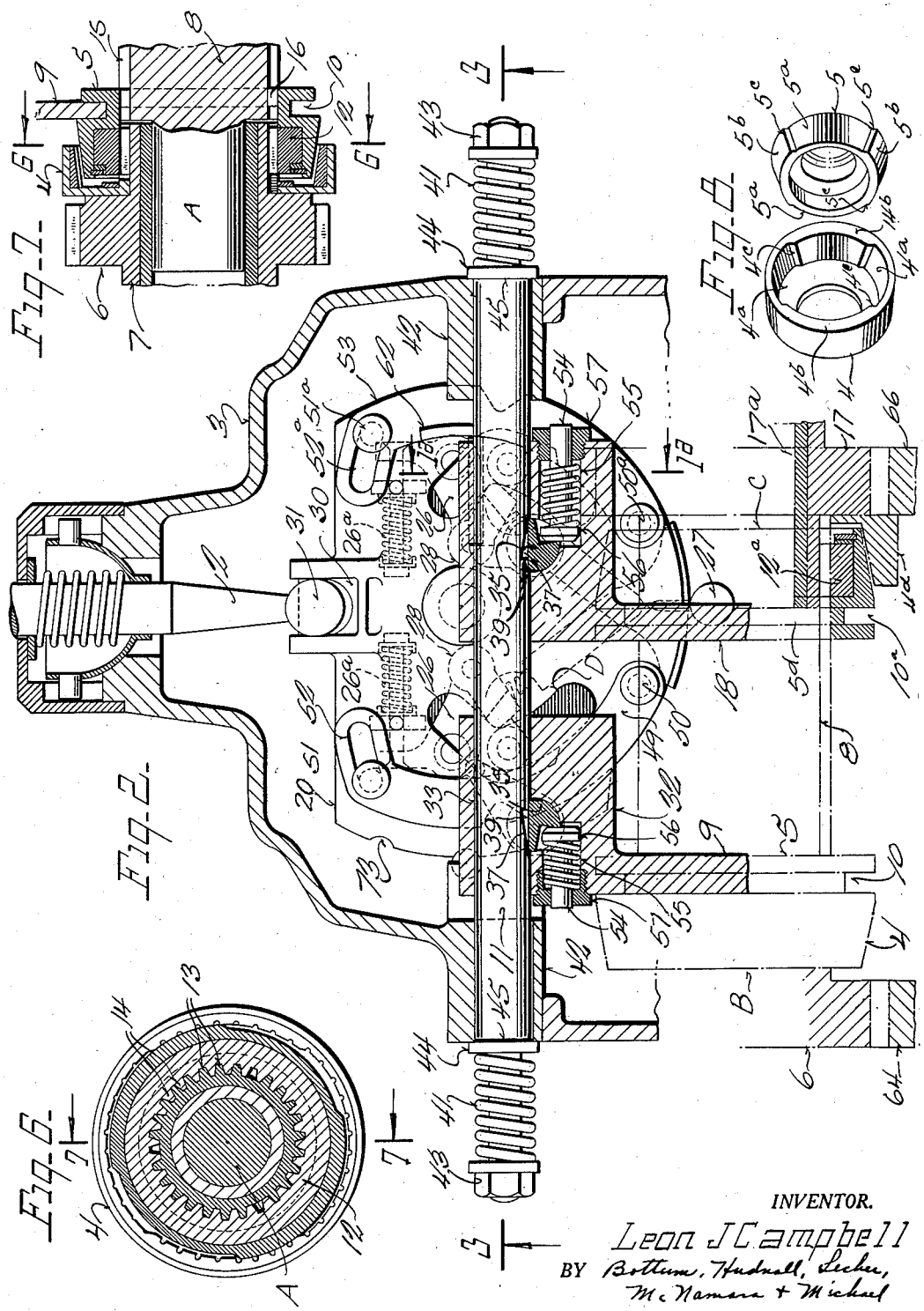

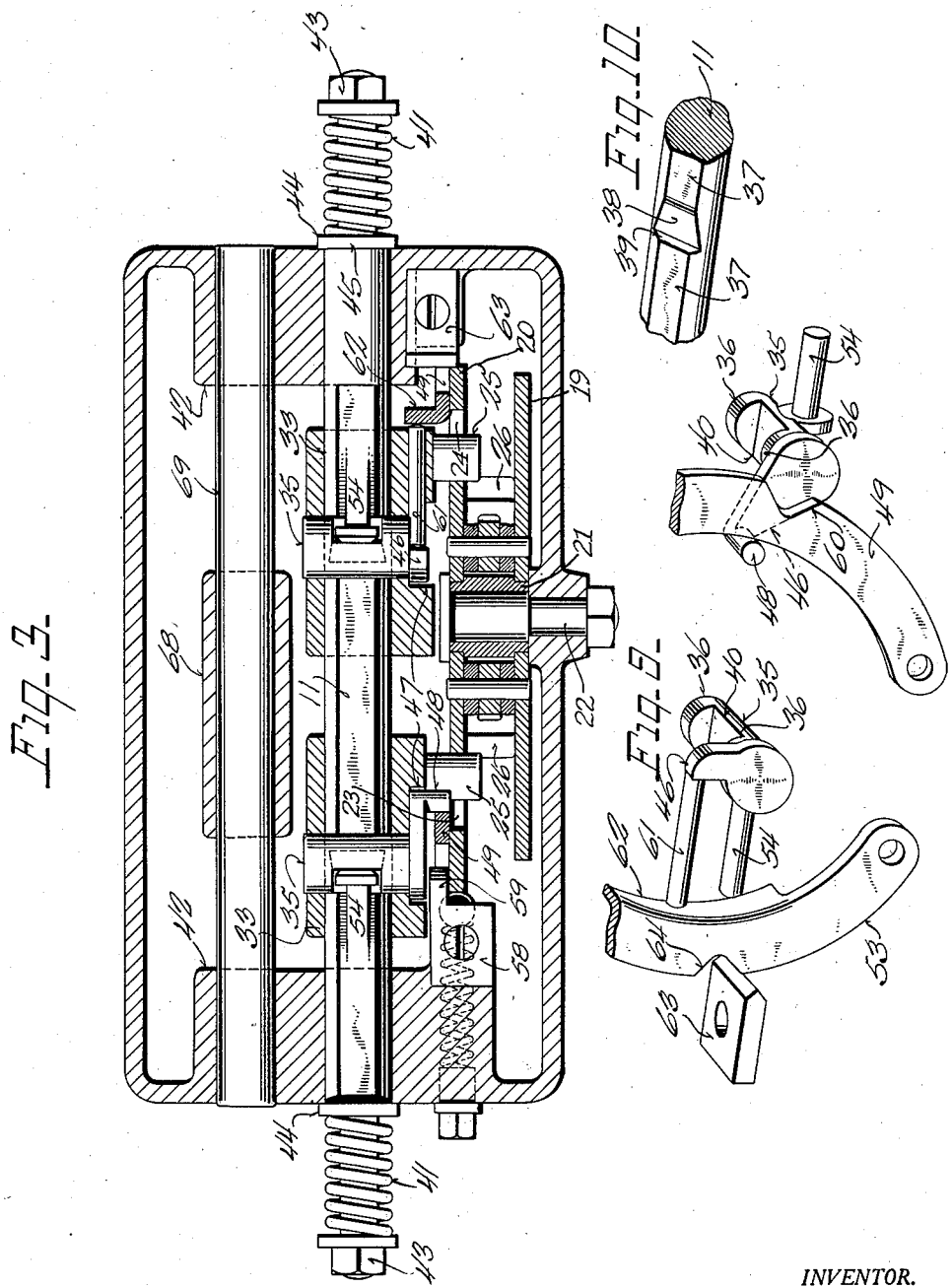

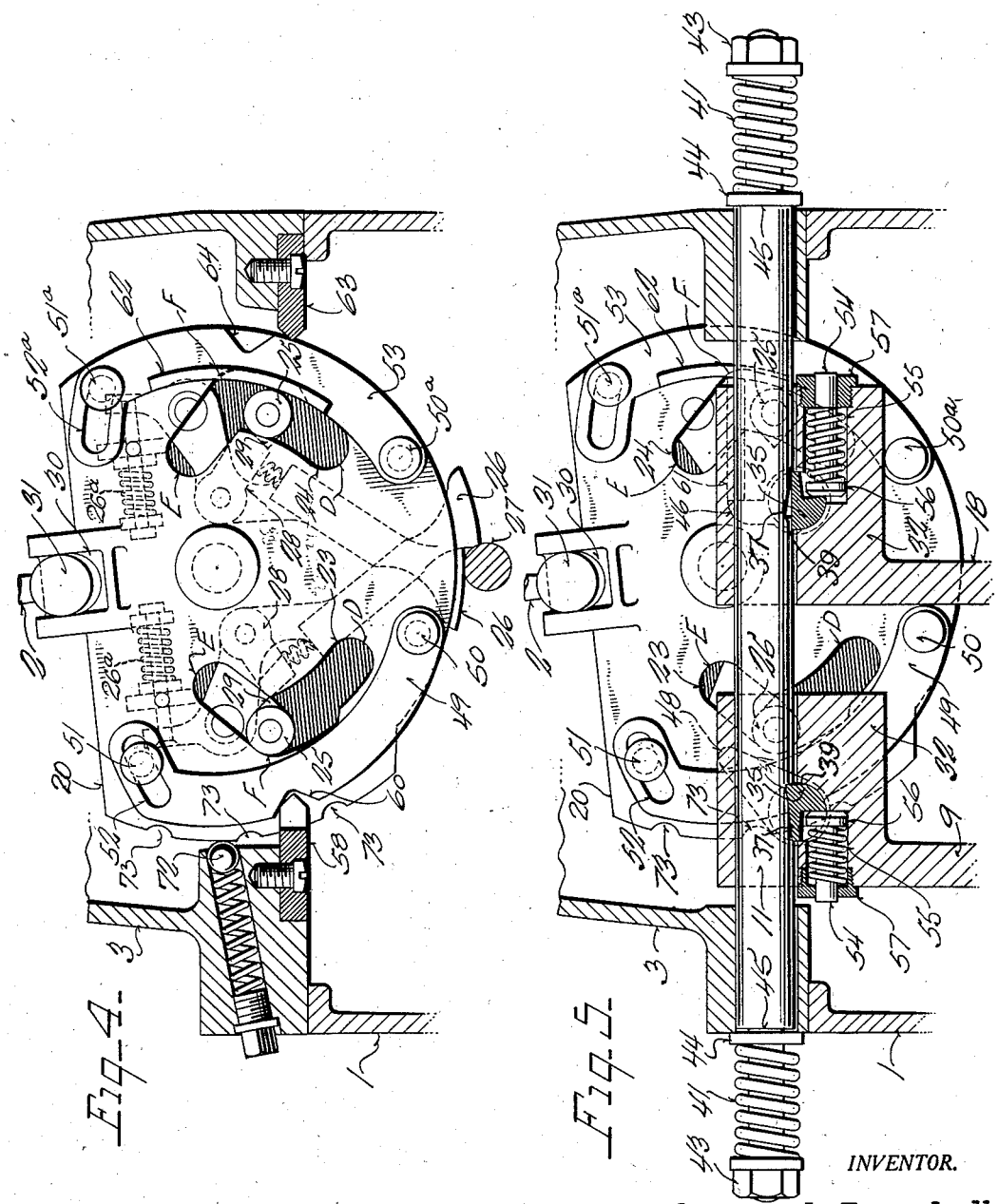

Patented Oct. 1, 1935

2,015,841

UNITED STATES PATENT OFFICE 2,015,841

CLUTCH MECHANISM AND CONTROL FOR CHANGE SPEED TRANSMISSIONS

Leon Jay Campbell, Buchanan, Mich., assignor to Campbell-Buchanan Corporation, Chicago, Ill., a corporation of Illinois Application November 12, 1934, Serial No. 752,556

13 Claims. (Cl. 192—53)

This invention relates to automotive change speed transmission mechanisms of the synchromesh type and more particularly to transmissions of the character disclosed in my co-pending applications Serial No. 635,957, filed October 3, 1932 which has matured into Patent No. 1,984,354 granted December 18, 1934 and Serial No. 648,899, filed December 27, 1932.

The general purpose and object of my present invention is to provide spring means for yieldably holding the clutch members of the frictional clutch engaged while said clutch is closed independently of the means incorporated in the speed selecting mechanism of the transmission to initially close said clutch, whereby the holding means referred to may be made stronger and thus effectively hold said clutch members together against their normal tendency to separate by reason of the inclination of their clutch engaging surfaces.

A further object of the present invention is to accomplish the result referred to by having said spring means acting through the rod on which the shifter element for the frictional clutch is mounted.

In carrying out this object I provide means for locking the shifter element to the rod while the frictional clutch is closed, and have the rod slidably mounted in the transmission case whereby the spring means resists endwise movement of the rod in the tendency of the clutch members of the frictional clutch while engaged to separate.

It is a further object of the present invention to provide the locking means in the form of a key rockably mounted on the shifter element and movable under the control of the speed selecting mechanism of the transmission into and out of locking engagement with the rod whereby the shifter element may slide on the rod when necessary in the opening and closing action.

A further object of the present invention is to provide gravity responsive means for controlling the releasing of the key for locking the shifter element to the rod while the frictional clutch is closed.

The invention consists further in the features hereinafter described and claimed.

In the accompanying drawings:

Fig. 1 is a transverse vertical sectional view of a transmission mechanism of the character referred to embodying the features of my invention;

Fig. 1a is a similar sectional view taken on line 1a—1a of Fig. 2 to illustrate details of construction to be hereinafter described;

Fig. 2 is a longitudinal sectional view taken on the line 2—2 of Fig. 1;

Fig. 3 is a horizontal sectional view taken on line 3—3 of Fig. 2;

Fig. 4 is a view similar to that of Fig. 2 showing the speed selecting mechanism shifted to a position closing one of the frictional clutches;

Fig. 5 is a view similar to that of Fig. 4 showing the shifter element for said clutch locked to its supporting rod by the key means of my invention;

Fig. 6 is a transverse sectional view through one of the clutch assemblies, the section being taken on line 6—6 of Fig. 7;

Fig. 7 is a longitudinal sectional view taken on line 7—7 of Fig. 6;

Fig. 8 is a perspective view of the two members of the frictional clutch shown in disengaged position;

Fig. 9 is a perspective view of the key control assembly of my invention; and

Fig. 10 is a perspective view showing the locking notch in the shifter element supporting rod.

In the drawings, 1 indicates the transmission case which houses and supports the transmission gear assembly and the mechanism by which the various speed changes afforded by the gear assembly may be selected. This mechanism includes a hand shift lever 2 which extends out of the case through its cover section 3 and into the body of the car for actuation by the driver as in devices of this general character. The lever 2 has a universal mounting in the cover section 3 and is selectively engageable at its lower end with the shifting mechanism to be presently described.

The gear assembly may be of the character disclosed in my co-pending application Serial No. 635,957, aforesaid, and need not be shown as described herein in detail except in so far as its parts co-operate with the shifter element and locking means therefor of my present invention. Generally, the gear assembly includes two synchronizing clutch units, one for the second or intermediate speed afforded by the transmission and the other for high speed or direct drive. These clutch units follow generally the construction disclosed in my other co-pending application Serial No. 648,899, aforesaid, and as shown in Figs. 7 and 8 hereof, each clutch unit comprises a frictional clutch and a positive clutch for selectively connecting the associated driving and driven elements of the transmission. The frictional clutch is closable in advance of the positive clutch to synchronize said elements prior to their connection by the positive clutch.

The clutch unit shown in Fig. 7 is for the third speed or direct drive afforded by the transmission and comprises a frictional clutch having a pair of separable or relatively shiftable clutch members, marked 4 and 5, respectively. The clutch member 4 is fixed to the gear 6 which is fixed to the main driving shaft 7 of the transmission. The shaft 7 extends into the front end of the case 1 from the master clutch (not shown) of the vehicle. The other clutch member 5 is splined on the driven shaft 8 of the transmission, which shaft is in line with the shaft 7 and has a spigot bearing connection therewith, as at A in Fig. 7. Clutch member 5 is shiftable into and out of clutched engagement with the clutch member 4 by a shifter element, in the form of a yoke 9 which engages the clutch member 5 in an annular groove 10 therein, as shown in Fig. 7. The yoke 9 is mounted on a supporting rod 11, to be presently described.

The clutch members 4 and 5 have inter-engaging annular inclined clutching surfaces, each of which, as shown in Fig. 8, have recesses and projections of similar circumferential extent and arrangement. This accords with the disclosure of my co-pending application Serial No. 648,899. The recesses on the two clutch members are marked herein as 4a and 5a, respectively, while the projections are marked 4b and 5b, respectively. When the projections on one clutch member enter the recesses in the other, the clutch members are positively engaged up to a predetermined torque, above which they may release the drive by reason of the inclines 4c, 5c at the ends of the projections and the recesses. When the projections engage, the clutch members may slip circumferentially to bring them into the positive driving engagement just referred to.

The positive clutch of the unit also comprises two separable or relatively shiftable clutch members. One comprises the end of the shaft 8 and the other comprises a ring 12 splined in the shaft 7 on the inner side of the gear 6. The inter-engaging splines on the shaft 7 and the ring 12 are shown in Fig. 6. In this figure, the splines on the shaft 7 are marked 13, while those on the ring 12 are marked 14. The splines on the shaft 8 are marked 15. The splines in the bore of the clutch member 5 are marked 16 in Fig. 7. The splines on the shafts 7 and 8 are similarly arranged and shaped and the two splined portions are equal in diameter, whereby the ring 12 which is shiftable with the clutch member 5 may be slid from shaft 7 onto shaft 8 and by bridging the joint between said shafts positively connect the shafts for direct rotation. The ring 12 has a rotative connection with the clutch member 5 whereby the ring may revolve with respect to said clutch member. The type of connection provided for this purpose follows the showing made in my application Serial No. 648,899.

The two synchronizing clutch units of the transmission are shown at B and C in Fig. 2. The clutch unit B comprises that detailed in Fig. 7. The clutch unit C is of similar construction. The shiftable clutch member 5d of the frictional clutch of unit C is splined on the splined portion of shaft 8, while the non-shiftable clutch member 4d of the frictional clutch is fixed to the second speed gear of the transmission, which gear is indicated at 17 in Fig. 2. The shiftable clutch member 12a of the positive clutch is splined on a sleeve 17a fixed to said gear and surrounding a reduced portion of the shaft 8 on the inner side of the gear. By this arrangement the gear 17 is selectively engageable with the shaft 8 through the clutch unit C. The shifter element or yoke 18 for this unit engages the clutch member 5d in a groove 10a therein, and said yoke is mounted on the rod 11 as shown in Fig. 2.

The rod 11, which supports the shifter elements 9 and 18, is slidably supported in the transmission case 1, as in the cover section 3, above and in parallel relation to shafts 7 and 8. The shifter elements 9 and 18 are slidably mounted on the rod 11, whereby said elements may be moved endwise of the rod to open and close the clutches which they control. To accomplish this, the following mechanism is provided.

Arranged in the case 1 on the inner side of the cover section 3 adjacent the rod 11 is a rockable member, comprising a pair of plates 19, 20 connected by a sleeve 21 for rotation in unison about a common pivot and supporting stud 22. The plates are mounted to extend above and below the rod 11, as shown in Figs. 1, 2, and 5, and the inner plate 20 is provided with a pair of slots 23, 24 in its portion adjacent the rod, as shown. The slots are for the respective shifter elements 9 and 18, slot 23 serving the element 9 and slot 24 serving the element 18. Each shifter element, as shown in Fig. 3, is provided with a fixed pin 25 extending laterally outward from the element and into its associated slot. The lower portion D of each slot is arranged concentric to the stud 22 while the upper portion E of the slot is eccentric to said stud. By this arrangement, one shifter element is maintained in its neutral position while the other element is being shifted to actuate its clutch unit. Each slot is widened transversely as at F, where its eccentric and concentric portions join. The purpose of this is to allow the spring biased levers 26, 26, carried by the plates 19, 20 when released from the abutment 27 to move the shifter yokes on the rod 11 to quickly close the frictional clutch controlled thereby. This is the action of the control mechanism shown in my application Serial No. 635,957, aforesaid, and which mechanism is duplicated herein. The springs for the levers 26 are marked 26a, 26a. There is a spring for each lever and these springs act when its lever is released from the abutment 27 to move the lever in a direction to shift the associated pin 25 across the widened portion of its slot as herein described as follows:

The levers 26 are located between the plates 19, 20 as in the application referred to, and are released for action when their free or lower ends are carried off of an abutment 27 below the plates and fixed to the transmission case, as shown in Fig. 1. The levers 26 by spring biased dogs 28 act on squared projections 29 on the pins 25 to shift the pins across the slots when the widened portions F are brought opposite the pins, as shown in Figs. 4 and 5. These figures show the plates 19, 20 rocked to position the widened portion of slot 23 opposite the pin of the shifter yoke 9. At this time the pin for the other yoke 18 is in the concentric portion D of its slot, as shown in Figs. 4 and 5. In order that the shift lever 2 may rock the plates 19, 20, the latter is provided at its upper edge in line with the axis of the stud 22 with a laterally and upwardly opening socket 30 to receive the lower end 31 of the hand shift lever 2, as shown in Figs. 1, 4, and 5. The portions D and E of the slots 23, 24 are substantially as wide as the pins 25 which they receive. Thus the pins by contact with the opposite side walls of the slots are held from movement across the slots, and the shifter yokes are likewise held from accidental movement. At the widened portions F of the slots, the pins depend on the yieldability of the levers to hold them at the outer edges of the slots. It is at this position that the clutch members of the frictional clutch are in closed relation. In accordance with my present invention, the holding power of the levers is not depended upon to hold these clutch members in engagement and resist the normal tendency of the clutch members to be thrown out of effective driving engagement by reason of their co-operating inclined surfaces. To accomplish these results, I provide the following mechanism.

As shown in the drawings, each shifter element 9, 18 has an upper or head portion 32 provided with a bore 33 through which the rod 11 extends. Each head portion 32 is provided with an additional bore 34 arranged below the bore 33 and intersecting the same in right angular relation thereto, as shown. Rockably mounted in the bore 34 is a key 35, the opposite ends 36, 36 of which fit in the cylindrical ends of the bore 34, as shown in Fig. 1. The key is cut away between its cylindrical ends to free the bar 11 when the key is in the position shown in Fig. 2. The under side of the bar 11, as shown in Fig. 10 is flattened as at 37 and in this flattened surface, at each yoke head 32, the bar has a notch 38 having an abrupt shoulder 39 at one end, as shown. The shoulder is arranged to face toward the nearest end of the bar and is engaged by the locking edge 40 of the key when the parts are positioned as shown at the left in Fig. 5. When the parts are so positioned, the key locks the yoke 9 to the rod 11 and the springs 41, 41 at the opposite ends of the rod hold the clutch members 4 and 5 of the frictional clutch of the unit B in yielding engagement. To accomplish this result, the rod 11 is slidably mounted at its ends in the transmission cover 3 in supporting lugs 42, 42. The ends of the rod extend exteriorly of the cover 3 and there provide supports for the springs 41 which are of the coiled expansion type. The tension of the springs may be adjusted by nuts 43 screwed on the outer ends of the rod.

The inner ends of the springs 41 bear against washers 44, which being exteriorly of the cover section 3 bear against the cover when the rod 11 is in its neutral position as shown in Fig. 2. At this time the transmission gear is in neutral and the springs exert an equal outward tension on the rod to hold it from accidental endwise movement. At the washers 44, the rod has shoulders 45, one for each washer. These shoulders are disposed on the rod to be substantially flush or co-planar with the outer surface of the cover section 3 when the rod is in its neutral position, whereby the springs rest the washers against the cover section to hold the rod in balance. When the shifter yoke 9 is locked to the rod by its key 35, as shown in Fig. 5, an endwise movement of the rod toward the right under the action of the clutch members 4 and 5 of the frictional clutch to separate is imparted to the rod and its right hand shoulder 45 is forced against the associated washer 44 moving it from the cover section 3 and compressing the opposite spring 41 as shown in Fig. 5. Thus the latter spring resists the tendency of the clutch members 4 and 5 to separate and holds them in firm but yielding engagement, whereby to secure an effective driving connection between said clutch members and to obtain an early synchronization of the driving and the driven shafts 7 and 8. The left hand spring 41 serves the shifter yoke 18 and holds the clutch members 4d and 5d in yielding engagement, when said members are in closed relation. The advantage of the arrangement is that it enables springs of greater power to be provided than possible for the levers 26. Moreover, the springs for the levers must be compressed to reset the levers, and this compression is done by the hand shift lever 2.

Obviously, these springs cannot be too strong, otherwise too much load would be placed on the operator in actuating the hand shifter lever 2. The springs 41 are entirely free of this lever, and thus may be made as strong as required. They act independently of the springs for the levers 26, and are compressed by the power of the engine with which the transmission is connected. Moreover, the springs 41 are exterior of the transmission case where they are readily accessible for adjustment of their tension. Thus, the device may be set to place the desired tension on the clutch members of the frictional clutch of each unit and also to compensate for wear of the clutch engaging surfaces.

To rock the keys 35 into and out of locking engagement with the rod 11, I provide the following mechanism. Each key 35 is provided at its end adjacent the plate 20 with an arm 46, the head portions 32 of the yokes having recesses 47 to accommodate the key arms and allow for their swinging movement as shown in Fig. 3. This allows for a compact arrangement of the parts as required in a transmission assembly. The left hand key, that is, the key for the yoke 9 is provided at or adjacent its outer end with a crank pin 48 extending laterally outward from the arm and in the path of swinging movement of an arc-shaped gravity responsive lever 49 arranged on the side of the plate 20 adjacent the yoke 9 and pivoted to the plate at the lower end of the lever, as at 50. The lever 49 is guided and limited in its swinging amount by a bolt 51 secured to the plate 20 and extending through an elongated slot 52 in the upper end of the lever, the slot being concentric to the fulcrum 50 of the lever. A similar lever 53 is provided on the plate 20 for the right hand key 35, that is, the key for the yoke 18. The lever 53 is pivoted at its lower end to the plate 20, as at 50a, and has a bolt and slot connection with the plate at the upper end of the lever as at 51a, 52a as shown.

The keys 35 are normally urged in a direction to rock them against the rod 11 by spring pressed plungers 54, 54, one for each key and mounted in recesses 55 in the respective yoke heads 32 as shown in Figs. 2 and 5. The plungers have heads 56 at their ends engaging against abutments on the keys below their axes of rotation and which abutments constitute the bottom walls of recesses in the keys for the heads of the plungers. The stems of the plungers are slidably mounted in closure plugs 57 at the outer ends of the recesses 55, as shown. By the construction described, the keys when freed or released for rocking movement by the levers 49, 53 are rocked by the springs into the notches 38 of the rod 11 as soon as the notches and the keys are brought into register. This occurs through the action of the levers 26 when released from their abutment 27 as heretofore described.

Movement of the levers 49, 53 to release the keys is accomplished as follows: The left hand lever 49 co-operates with an abutment 58 secured to the cover section 3 adjacent the outer arcuate edge of the plate 20 as shown in Fig. 4. This abutment, as shown in Fig. 3, is in the form of a plate and has an inwardly extending rigid projection or finger 59 to reach the lever 49. The latter by gravity rests against the finger and when the plate 20 is in its neutral position as shown in Fig. 2, the finger holds the lever 49 at the inner limit of its swinging movement. With the inner edge of the lever 49 against the pin 48 on the arm of the key 35, the latter is held in its released position and against rocking by its spring plunger 54 as shown in Fig. 2. As the plate 20 is rocked to the left as shown in Figs. 4 and 5, the lever 49 is carried with the plate 20, and when a notch 60 in the outer edge of the lever 49 is brought opposite the finger 59, the lever 49 by gravity swings outwardly releasing its hold on the pin 48 and permits the plunger 54 to rock the key 35 into locking engagement with the rod 11 as previously explained.

The lever 53 acts similarly with respect to its key 35, but by a slightly different construction made necessary by the location of the yoke head somewhat inward from the adjacent outer edge of the plate 20. The construction for lever 53 comprises a push rod 61 slidably mounted in the yoke head 32 between the key arm 46 and the lever 53 as shown in Figs. 3 and 9. The lever 53 has a lateral flange 62 on one side to engage the adjacent end of the rod 61. The other end of the rod abuts against the arm 46 adjacent its outer end. An abutment plate 63 is also provided for the lever 53. This plate engages the outer arcuate edge of the lever and when the parts are in neutral position, as shown in Fig. 2, the plate 63 holds the lever 53 at the limit of its inward movement and maintains the key 35 in its released position. When the plate 20 is rocked to the right to select second speed, the lever 53 moves outward by gravity to release the holding action of the key 35 as soon as the notch 64 in the lever is brought opposite the plate 63.

The keys 35 lock the shifter yokes to the rod 11 only during the period that the members of the frictional clutches are engaged to synchronize the driving and the driven elements controlled by said clutches. The ends of the plates 58 and 63 where they engage the levers 49 and 53 and the notches 60, 64 in said levers are beveled so that the plates may easily ride out of the notches in the rocking of the plate 20. In the continued movement of the plate 20 from the position shown in Figs. 4 and 5, the plate 58 rides out of the notch 60 and moves the lever 49 inwardly. This rocks the key 35 out of the notch 38 of the rod 11 and releases the rod from the yoke 9. The latter is thus freed for inward movement along the rod to first move the clutch member 5 out of clutched engagement with the member 4 and then move the clutch ring 12 on the shaft 8 to directly connect shafts 7 and 8. The movement of the yoke 9 in this direction is due to the cam action of the outer edge of the slot portion E on the pin 25. On returning the plate 20 to its neutral position, the lower or inner edge of this slot portion moves the yoke in the opposite direction to shift the clutch ring 12 back on the shaft 7 to release the shaft 8. The same action takes place with respect to the yoke 18 by the slot 24 in rocking the plate 20 to the right to first select and then release the second speed.

To reduce friction, the pins 25 have rollers which fit in and bridge the slots 23, 24.

In the transmission gear set, the gear 6 is in constant mesh with a gear 64 (Fig. 2) revolubly mounted on a lay shaft 65 journaled in the box 1 below and in parallel relation to the aligned shafts 7 and 8 as shown in Fig. 1. Gear 17 is in constant mesh with a gear 66 also revolubly mounted on the lay shaft 65. Gears 64 and 66 are connected for rotation in unison by a sleeve 67. By this arrangement the second speed gear 17 is driven from the main shaft 7 through gears 6, 64, and 66.

For the first or low speed and reverse, the transmission has a gear (not shown) splined on the shaft 8 and shifted through a yoke 68 into and out of mesh with either one of two gears (not shown) on the sleeve 67 on the lay shaft 65. One of these gears is in mesh with a reverse idler pinion as in devices of this character. The yoke 68 is slidably mounted on a rod 69 mounted in the cover section 3 at one side of the rod 11 as shown in Figs. 1 and 3. The yoke 68 is shifted by the hand shift lever 2, having as shown in Fig. 1, an upward projection 70 having spaced lugs 71 at its upper end for engagement with the lower end 31 of said shift lever.

A ball check arrangement is provided for releasably holding the plates 19 and 20 in their various shifted positions. This check, as shown in Figs. 3 and 4, comprises a spring pressed ball 72 carried by the cover section and engaging one edge of the plate 20. This edge has notches 73 to receive the ball. These notches are spaced to accord with the neutral and speed change positions of the plates.

The details of construction and arrangement of parts shown and described may be variously changed and modified without departing from the spirit and scope of my invention except as pointed out in the appended claims.

I claim as my invention:

1. In a transmission mechanism of the character described having a case and driving and driven elements, a frictional clutch and a positive clutch for selectively connecting said elements, said clutches each having relatively shiftable clutch members on the respective elements, a rod slidably mounted in the case, a shifter element slidably mounted on the rod and connected with the shiftable member of the frictional clutch, means operable on the shifter element to open and close the clutches, said means serving to close the frictional clutch in advance of the positive clutch, means for locking the shifter element to the rod while the frictional clutch is closed, and means acting through the rod to yieldably hold the members of the frictional clutch engaged while said clutch is closed.

2. In a transmission mechanism of the character described having a case and driving and driven elements, a frictional clutch and a positive clutch for selectively connecting said elements, said clutches each having relatively shiftable clutch members on the respective elements, a rod slidably mounted in the case, a shifter element slidably mounted on the rod and connected with the shiftable member of the frictional clutch, means operable on the shifter element to open and close the clutches, said means serving to close the frictional clutch in advance of the positive clutch, a key rockably mounted on the shifter element, means for rocking the key into locking engagement with the rod when the frictional clutch is closed to lock the shifter element to the rod while said clutch is closed, and means acting through the rod to yieldably hold the members of the frictional clutch engaged while said clutch is closed.

3. In a transmission mechanism of the character described having a case and driving and driven elements, a frictional clutch and a positive clutch for selectively connecting said elements, said clutches each having relatively shiftable clutch members on the respective elements, a rod slidably mounted in the case, a shifter element slidably mounted on the rod and connected with the shiftable member of the frictional clutch, a member rockably mounted in the case adjacent the rod and having means acting on the shifter element in the movement of the member to open and close the clutches, said means serving to close the frictional clutch in advance of the positive clutch, a key rockably mounted on the shifter element, means for rocking the key into locking engagement with the rod to lock the shifter element to the rod, means carried by the rockable member and co-operating with the key to release the key to lock the shifter element to the rod when the frictional clutch is closed, and means acting through the rod to yieldably hold the members of the frictional clutch engaged while said clutch is closed.

4. In a transmission mechanism of the character described having a case and driving and driven elements, a frictional clutch and a positive clutch for selectively connecting said elements, said clutches each having relatively shiftable clutch members on the respective elements, a rod slidably mounted in the case, a shifter element slidably mounted on the rod and connected with the shiftable member of the frictional clutch, a member rockably mounted in the case adjacent the rod and having means acting on the shifter element to open and close the clutches, said means serving to close the frictional clutch in advance of the positive clutch, a key rockably mounted on the shifter element, means for rocking the key into locking engagement with the rod for locking the shifter element to the rod, gravity responsive means carried by the rockable member and released on the closing of the frictional clutch to release the key to lock the shifter element to the rod while the frictional clutch is closed, and means acting through the rod to yieldably hold the members of the frictional clutch engaged while said clutch is closed.

5. In a transmission mechanism of the character described having a case and driving and driven elements, a frictional clutch and a positive clutch for selectively connecting said elements, said clutches each having relatively shiftable clutch members on the respective elements, a rod slidably mounted in the case, a shifter element slidably mounted on the rod and connected with the shiftable member of the frictional clutch, a member rockably mounted in the case adjacent the rod and having means acting on the shifter element in the movement of the member to open and close the clutches, said means serving to close the frictional clutch in advance of the positive clutch, a key rockably mounted on the shifter element, means for rocking the key into locking engagement with the rod to lock the shifter element to the rod, a gravity responsive lever carried by the rockable member and co-operating with the key to control the action thereof, means co-operating with the lever to normally hold the key out of locking engagement with the rod and to release the lever to release the key to lock the shifter element to the rod while the frictional clutch is closed, and means acting through the rod to yieldably hold the members of the frictional clutch engaged while said clutch is closed.

6. In a transmission mechanism of the character described having a case and driving and driven elements, a frictional clutch and a positive clutch for selectively connecting said elements, said clutches each having shiftable clutch members on the respective elements, a rod slidably mounted in the case, a shifter element slidably mounted on the rod and connected with the shiftable member of the frictional clutch, a member rockably mounted in the case adjacent the rod and having means acting in the movement of the member to open and close said clutches, said means serving to close the frictional clutch in advance of the positive clutch, a key rockably mounted on the shifter element, means for rocking the key into locking engagement with the rod to lock the shifter element to the rod, a gravity responsive lever fulcrumed on said member and co-operating with the key to control the action thereof, a fixed abutment carried by the case and co-operating with the lever to normally hold the key out of locking engagement with the rod, said lever having a recess which when brought opposite the abutment will release the lever to the action of gravity to release the key to lock the shifter element to the rod when the frictional clutch is closed, and means acting through the rod to yieldably hold the members of the frictional clutch engaged while said clutch is closed.

7. In a transmission mechanism of the character described having a case and driving and driven elements, a frictional clutch and a positive clutch for selectively connecting said elements, said clutches each having relatively shiftable clutch members on the respective elements, a rod slidably mounted in the case, a shifter element slidably mounted on the rod and connected with the shiftable member of the frictional clutch, a member rockably mounted in the case adjacent the rod and having means acting in the movement of the member to open and close the clutches, said means serving to close the frictional clutch in advance of the positive clutch, a key rockably mounted on the shifter element, means for rocking the key into locking engagement with the rod to lock the shifter element to the rod, a gravity responsive lever fulcrumed on said member, co-acting means between the key and the lever whereby when the lever is moved inwardly it will turn the key to release the shifter element from the rod and when moved outwardly will release the key for locking the shifter element to the rod, a fixed abutment plate carried by the case and co-operable with the outer edge of the lever to move the lever inwardly, said lever having a notch in its outer edge whereby said notch when brought opposite the abutment will release the lever for outward movement by gravity to release the key to lock the shifter element to the rod while the frictional clutch is closed, and means acting through the rod to yieldably hold the members of the frictional clutch engaged while said clutch is closed.

8. In a transmission mechanism of the character described having a case and driving and driven elements, a frictional clutch and a positive clutch for selectively connecting said elements, said clutches each having relatively shiftable clutch members on the respective elements, a rod slidably mounted in the case, a shifter element slidably mounted on the rod and connected with the shiftable member of the frictional clutch, means operable on the shifter element to open and close the clutches, said means serving to close the frictional clutch in advance of the positive clutch, means for locking the shifter element to the rod while the frictional clutch is closed, and means to resist sliding movement of the rod under the tendency of the frictional clutch members to separate when said clutch is closed to yieldably hold said members together while said clutch is closed.

9. In a transmission mechanism of the character described having a case and driving and driven elements, a frictional clutch and a positive clutch for selectively connecting said elements, said clutches each having relatively shiftable clutch members on the respective elements, a rod slidably mounted in the case, a shifter element slidably mounted on the rod and connected with the shiftable member of the friction clutch, means operable on the shifter element to open and close the clutches, said means serving to close the frictional clutch in advance of the positive clutch, means for locking the shifter element to the rod while the frictional clutch is closed, spring means to resist sliding movement of the rod under the tendency of the frictional clutch members to separate when said clutch is closed to yieldably hold said members together while said clutch is closed, and means for adjusting the tension of the spring means.

10. In a transmission mechanism of the character described having a case and driving and driven elements, a frictional clutch and a positive clutch for selectively connecting said elements, said clutches each having relatively shiftable clutch members on the respective elements, a rod slidably mounted in the case, a shifter element slidably mounted on the rod and connected with the shiftable member of the frictional clutch, means operable on the shifter element to open and close the clutches, said means serving to close the frictional clutch in advance of the positive clutch, means for locking the shifter element to the rod while the frictional clutch is closed, and springs on the rod at the opposite ends thereof and co-operating with the case and with shoulders on the rod to yieldably hold the members of the frictional clutch engaged while said clutch is closed.

11. In a transmission mechanism of the character described having a case and driving and driven elements, a frictional clutch and a positive clutch for selectively connecting said elements, said clutches each having relatively shiftable clutch members on the respective elements, a rod slidably mounted in the case, a shifter element slidably mounted on the rod and connected with the shiftable member of the frictional clutch, means operable on the shifter element to open the clutches and to close the clutches by closing the frictional clutch in advance of the positive clutch, the means for closing the frictional clutch comprising a releasable spring means, means for locking the shifter element to the rod while the frictional clutch is closed, and spring means acting through the rod to yieldably hold the members of the frictional clutch engaged while said clutch is closed independently of the first mentioned spring means.

12. In combination in a transmission mechanism of the character described having a case and driving and driven elements, a clutch assembly for selectively connecting said elements and having a frictional clutch having relatively shiftable clutch members on the respective elements, a rod slidably mounted in the case and having outwardly facing shoulders adjacent its opposite ends, a shifter element slidably mounted on the rod between said shoulders and connected with the shiftable member of the frictional clutch, means operable on the shifter element to open and close the frictional clutch, means for locking the shifter element to the rod while the frictional clutch is closed, and coiled springs and movable abutments therefor on the rod beyond the shoulders, said springs seating the abutments on the case when holding the rod against endwise movement and seating the abutments against the shoulders when resisting endwise movement of the rod to yieldably hold the members of the frictional clutch engaged when said clutch is closed.

13. In a change speed transmission of the character described having a case and a pair of driving elements providing different speeds and selectively engageable with a common driven element by a pair of frictional and positive clutch units, one for each driving element, said units having nonshiftable clutch members on the driving elements and shiftable clutch members on the driven element, a rod slidably mounted in the case, a pair of shifter elements slidably mounted on the rod, one for each of the clutch units and connected with the shiftable clutch members thereof, means for alternately operating on the shifter elements to open and close the positive and frictional clutches of said respective units, said means serving to close the frictional clutch of a unit in advance of the positive clutch of the unit, means for releasably locking the shifter elements to the rod, said means being controlled in its operation through the action of the clutch opening and closing means to lock a shifter element to the rod while its frictional clutch is closed, and spring means co-operating with the opposite ends of the rod to yieldably hold the members of the frictional clutches engaged when said clutches are closed.

LEON JAY CAMPBELL.